United States Patent
Baxter et al.

(10) Patent No.: US 12,247,781 B2
(45) Date of Patent: Mar. 11, 2025

(54) CARRIER GAS STREAM PROCESSING SYSTEM AND METHOD

(71) Applicant: Chart Energy & Chemicals, Inc., Ball Ground, GA (US)

(72) Inventors: Larry L. Baxter, Orem, UT (US); Stephanie Burt, Provo, UT (US); Catherine Dorsi, Houston, TX (US); Ravikumar Vipperla, Katy, TX (US)

(73) Assignee: Chart Energy & Chemicals, Inc., Ball Ground, GA (US)

( * ) Notice: Subject to any disclaimer, the term of this patent is extended or adjusted under 35 U.S.C. 154(b) by 392 days.

(21) Appl. No.: 17/842,021

(22) Filed: Jun. 16, 2022

(65) Prior Publication Data
US 2022/0404095 A1    Dec. 22, 2022

Related U.S. Application Data

(60) Provisional application No. 63/211,182, filed on Jun. 16, 2021.

(51) Int. Cl.
*F25J 3/02* (2006.01)
*B01D 53/02* (2006.01)

(52) U.S. Cl.
CPC ........... *F25J 3/0266* (2013.01); *B01D 53/02* (2013.01); *F25J 2205/30* (2013.01); *F25J 2210/70* (2013.01); *F25J 2215/80* (2013.01); *F25J 2245/02* (2013.01)

(58) Field of Classification Search
CPC ......... B01D 53/02; B01D 53/04; F25J 3/0266
See application file for complete search history.

(56) References Cited

FOREIGN PATENT DOCUMENTS

CN    110156016 A  *  8/2019

OTHER PUBLICATIONS

International Search Report and Written Opinion for International Application PCT/US2022/033755 Dated Sep. 5, 2022.
Alptekin, Gokhan, et al., "Development of Highly Efficient Mars ISRU CO2 Recovery System, 49th International Conference on Environmental Systems", pp. 1-8, (2019).
Bedont, Amorelli, et al., "An Experimental Investigation into the use of Molten Carbonate Fuel Cells to Capture Co2 from Gas Turbine Exhaust Gases", pp. 1-9, (2003).
Chiesa, Paolo, et al., "CO2 Cryogenic Separation from Combined Cycles Integrated with Molten Carbonate Fuel Cells", International Journal of Hydrogen Energy, vol. 36, No. 16, pp. 10355-10365, (2011).

(Continued)

*Primary Examiner* — Robert A Hopkins
(74) *Attorney, Agent, or Firm* — Cook Alex Ltd.

(57) ABSTRACT

A system for separating carbon dioxide from a carrier gas includes a $CO_2$ enrichment subsystem that receives a carrier gas stream and produces an enriched carbon dioxide fluid stream. The system also includes a $CO_2$ polishing subsystem in fluid communication with the $CO_2$ enrichment subsystem that produces a carbon dioxide rich fluid stream. In a corresponding method, a carrier gas is received in a $CO_2$ enrichment subsystem and an enriched carbon dioxide fluid stream is produced. The enriched carbon dioxide fluid stream is directed to a $CO_2$ polishing subsystem wherein a stream further enriched in carbon dioxide is produced.

26 Claims, 2 Drawing Sheets

(56) References Cited

OTHER PUBLICATIONS

Songolzadeh, Mohammad et al. "Carbon Dioxide Separation from Flue Gases: A Technological Review Emphasizing Reduction in Greenhouse Gas Emissions", The Scientific World of Journal, vol. 2014, pp. 1-34 (2014).

Xu, Gang et al., "An Improved $CO_2$ Separation and Purification System Based on Cryogenic Separation and Distillation Theory", Energies, vol. 7, pp. 3484-3502 (2008).

* cited by examiner

CARRIER GAS STREAM PROCESSING SYSTEM AND METHOD

CLAIM OF PRIORITY

This application claims the benefit of U.S. Provisional Application No. 63/211,182, filed Jun. 16, 2021, the contents of which are hereby incorporated by reference.

FIELD OF THE DISCLOSURE

The present disclosure relates generally to systems and methods for the purification of gases and, more particularly, to systems and methods for separating carbon dioxide from a carrier gas stream and purifying the separated carbon dioxide stream.

BACKGROUND OF THE INVENTION

Removal of carbon dioxide from carrier gas streams, such as flue gas streams produced by carbon burning processes of, for example, a gas turbine, coal power plant, cement plant, fire heaters, etc., process streams and/or a waste streams, is desirable as it is commonly believed that carbon dioxide represents a significant factor in increasing the greenhouse effect and global warming. Carbon dioxide streams of high purity are desirable as they allow for efficient injection of carbon dioxide into wells for sequestration and are also useful for enhanced oil recovery, in cement plants and other processes.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for separating carbon dioxide from a carrier gas includes a $CO_2$ enrichment subsystem configured to receive a carrier gas stream and produce an enriched carbon dioxide fluid stream. The system also includes a $CO_2$ polishing subsystem in fluid communication with the $CO_2$ enrichment subsystem and configured to produce a carbon dioxide rich fluid stream.

In another aspect, a process for separating carbon dioxide from a carrier gas includes the steps of receiving a carrier gas in a $CO_2$ enrichment subsystem, producing an enriched carbon dioxide fluid stream in the $CO_2$ enrichment subsystem, directing the enriched carbon dioxide fluid stream to a $CO_2$ polishing subsystem and producing a carbon dioxide rich fluid stream in the $CO_2$ polishing subsystem.

DETAILED DESCRIPTION OF EMBODIMENTS

While the disclosure below references processing of flue gas streams, the technology may be used for the processing of any carrier gas stream containing carbon dioxide including, but not limited to, process streams and/or waste streams.

Figure 1:
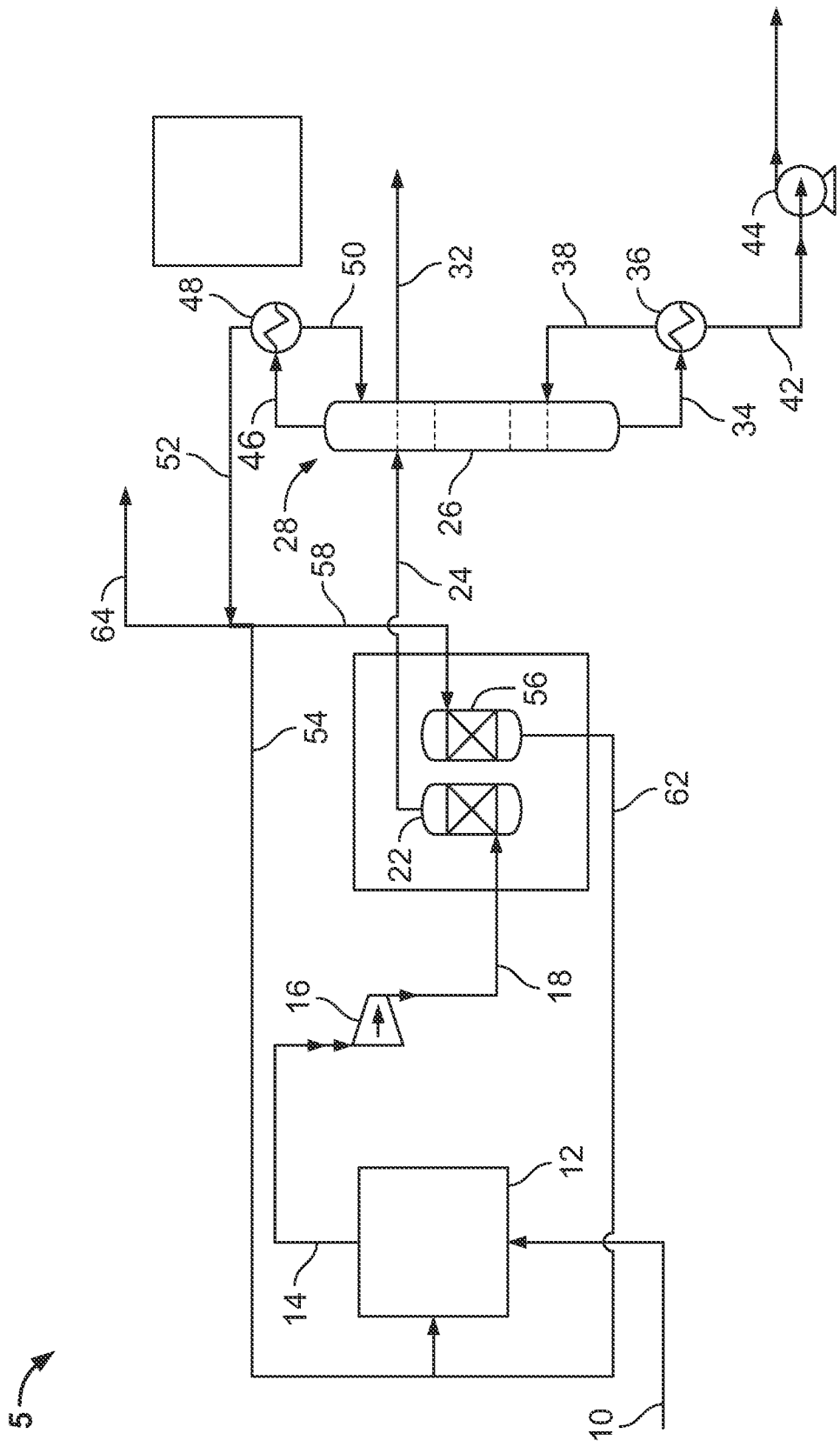
FIG. 1 is a process flow diagram in a first embodiment of the system and method of the disclosure.

A first embodiment of the system of disclosure is indicated in general at 5 in FIG. 1. A carrier gas stream, such a flue gas stream 10, enters a $CO_2$ enrichment subsystem 12 whereby an enriched carbon dioxide gas stream 14 is concentrated at low pressure and produced. As an example only. The enriched carbon dioxide gas stream may contain approximately 350% to 98% carbon dioxide. As an example only, stream 14 may be ~90% carbon dioxide on a mole basis at approximately atmospheric pressure.

Systems suitable for use as $CO_2$ enrichment subsystem 12 are known in the art with examples including, but not limited to, metal-organic framework (MOF) technology, membranes, absorbents, process modifications (recirculation, chemical looping, etc.), and/or the MOF process or other technology available from Svante Inc. of Burnaby, BC Canada. The $CO_2$ enriched subsystem 12 may also, or in addition, include the technology disclosed in Sustainable Energy Solutions, Inc. U.S. Pat. Nos. 8,715,401; 8,764,885; 9,250,012; 9,410,736; 10,213,731; 10,195,615; 10,399,092; 10,328,384; 10,537,843; 10,458,704; 10,549,229; 10,724,793; 10,739,067; 10,807,924; 10,969,169 and/or U.S. Patent Application Publication Nos. US 2018/0031315; US 2020/0018545; US 2020/0018546; US 2020/0298179; US 2020/0316547 and/or US 2020/0318900, all to Sustainable Energy Solutions, Inc., the contents of each of which are hereby incorporated by reference.

The enriched carbon dioxide stream 14 is next compressed in one or more compressors 16, where each compressor may have one or more compression stages. Prior to each compression, the stream 14 may optionally be cooled. In some embodiments, the stream 14 may be cooled and compressed in several stages, with free water knock out in between stages. As examples only, air coolers or water cooling may be used for the inter-stage cooling.

The pressurized and enriched carbon dioxide stream 18 flows to an optional dehydration unit, such as a molecular sieve unit 22. The dehydration unit 22 removes any remaining uncondensed water from the carbon dioxide stream sufficient to prevent freezing and hydrate formation in the distillation column 26 introduced below. In alternative embodiments, the dehydration unit 22 may be placed before the one or more compressors 16 (i.e., between the $CO_2$ enriched subsystem 12 and the compressor 16 of FIG. 1) or, when multiple compression stages or multiple compressors 16 are used, the dehydration unit 22 may be placed between the multiple compression stages or multiple compressors.

The resulting dehydrated stream 24 is directed to one or more distillation towers or columns 26, which is/are part of a $CO_2$ polishing subsystem, indicated in general at 28. In the following discussion, features and operation of distillation column 26 are understood to apply to each column if the $CO_2$ polishing subsystem 28 includes multiple distillation columns.

In an alternative embodiment, the dehydration unit 22 of FIG. 1 may be omitted, with the pressurized and enriched carbon dioxide stream 18 flowing directly to distillation column 26. In such an embodiment, the distillation column 26 may be optionally provided with an optional liquid water draw off 32 or a decant vessel or trays that phase-separates liquid water from $CO_2$.

The distillation tower or column 26, as examples only, may operate between 20 and 60 bar, such as at ~40 bar. Within the distillation column 26, carbon dioxide is separated from the remaining components of stream 24 (or stream 18 if the dehydration unit 22 is omitted).

A resulting bottoms liquid stream 34 exits the bottom of the distillation column 26 and travels to a reboiler 36 (which may be heated by ambient air or another warming fluid) whereby a portion of stream 34 is evaporated and returned as stream 38 to the column. A carbon dioxide rich liquid stream 42 exits the bottom of the reboiler 36 and contains, as an example only, greater than approximately 90% to greater than approximately 99% carbon dioxide and less than approximately 10 parts per million (ppm) (mass) oxygen. The reboiler ensures that the liquid carbon dioxide product meets the oxygen spec of <10 ppm (mass). As an example only, this sets the reboiler temperature at +5 C for 40 bar.

A pump 44 may optionally be provided to direct the carbon dioxide rich liquid stream 42 to a use device, user or pipeline. As an example only, the tower bottoms product may be pumped by pump 44 into at pipeline operating at 152.7 bar (2,215 psia).

The vapor stream 46 exiting the top of the distillation column 26 having travels to a condenser 48 which is cooled by a refrigerant colder than the bubble point of carbon dioxide, or colder than liquid carbon dioxide, at the operating pressure of the distillation column 26. As examples only, the refrigerant may be propane, R134a or HFO-1234yf. A condensed stream 50 travels back to the column 26 for use as reflux.

The vapor from column 26 that cannot be condensed by the refrigerant in condenser 48 is recycled as recycle stream 52 to the $CO_2$ enrichment subsystem 12 via line 54 to increase the carbon dioxide concentration. Refrigeration may be recovered from the overhead vapor stream as it is let down to the feed pressure of the $CO_2$ enrichment subsystem 12.

The temperature of the distillation column overhead condenser 48 is set by the refrigerant selected, for example, propane, at −38 C. The condenser temperature in turn sets the carbon dioxide fraction in the tower overhead vapor at 37% (mole). The propane loop for the condenser 48 assumes water cooling to condense the propane.

A lower overhead temperature would reduce the carbon dioxide carryover slightly, until it reaches the freezing point of carbon dioxide at around −56 C in this pressure range. However, this would require a more expensive refrigerant system.

In an alternative embodiment, the recycle stream 52 may be used to regenerate a second mole sieve dehydration unit (or other type of dehydration unit) 56 via line 58 and then directed back to the $CO_2$ enrichment subsystem 12 via line 62. In such an embodiment, the second dehydration unit 56, after regeneration, may be substituted for dehydration unit 22 when unit 22 requires regeneration. The system may then be reconfigured so that vapor in line 58 travels to dehydration unit 22 and then from unit 22 through line 62 to the $CO_2$ enrichment subsystem. Alternately, air can be used to regenerate the dehydration units (22 and 56), however, this would require additional equipment not illustrated.

In another alternative embodiment, the vapor stream 52 can be vented either immediately off the tower 26 (through vent line 64) or after being used to regenerate dehydration unit 22 or 56. The vent line 64 may also be used in combination with recycle line 54 and/or regeneration line 58 with appropriate valving.

Figure 2:
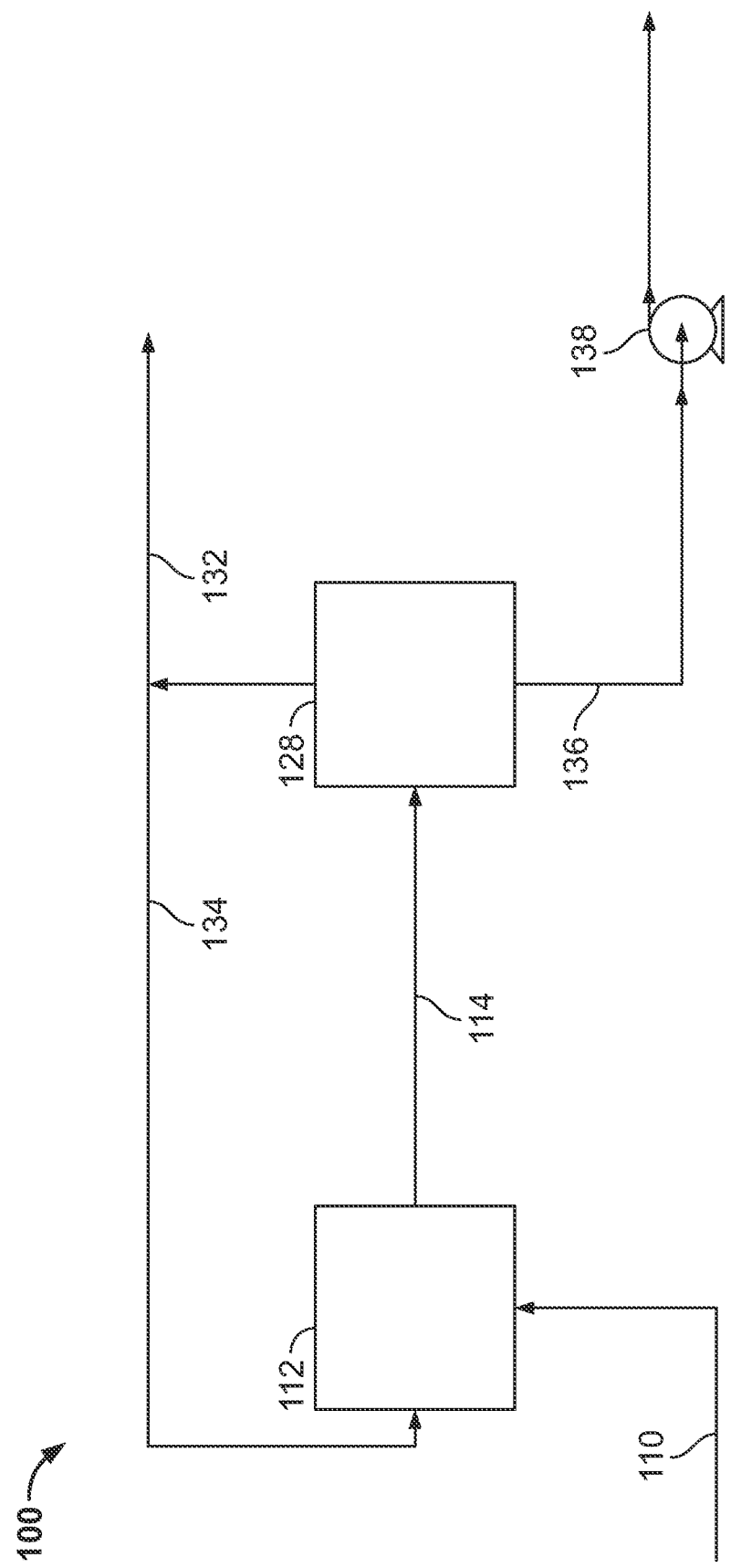
FIG. 2 is a process flow diagram in a second embodiment of the system and method of the disclosure.

A second embodiment of the system of the disclosure is indicated in general at 100 in FIG. 2. As illustrated in FIG. 2, a carrier gas stream, such as a flue gas stream 110, enters a $CO_2$ enrichment subsystem 112 whereby an enriched carbon dioxide gas stream 114 is concentrated at low pressure and produced. As an example only, the enriched carbon dioxide gas stream may contain approximately 35% to 98% carbon dioxide. Systems suitable for use as $CO_2$ enrichment subsystem 112 are known in the art with examples including, but not limited to, metal-organic framework (MOF) technology, membranes, absorbents, process modifications (re-circulation, chemical looping, etc.) and/or the MOF process or other technology available from Svante Inc. of Burnaby, BC Canada, and/or technology such as disclosed in Sustainable Energy Solutions, Inc. U.S. Pat. Nos. 8,715,401; 8,764,885; 9,250,012; 9,410,736; 10,213,731; 10,195,615; 10,399,092; 10,328,384; 10,537,843; 10,458,704; 10,549,229; 10,724,793; 10,739,067; 10,807,924; 10,969,169 and/or U.S. Patent Application Publication Nos. US 2018/0031315; US 2020/0018545; US 2020/0018546; US 2020/0298179; US 2020/0316547 and/or US 2020/0318900, all to Sustainable Energy Solutions, Inc., the contents of each of which are hereby incorporated by reference.

Stream 114 is next directed to a $CO_2$ polishing subsystem, indicated in general at 128, which in the embodiment of FIG. 2 is a cryogenic carbon capture system.

The $CO_2$ polishing subsystem 128, as examples only, may include the cryogenic carbon capture technology disclosed in U.S. Pat. No. 9,410,736 to Sustainable Energy Solution, Inc., the contents of which are hereby incorporated by reference. The $CO_2$ polishing subsystem 128 may also, or in addition, include the technology disclosed in Sustainable Energy Solutions, Inc. U.S. Pat. Nos. 8,715,401; 8,764,885; 9,250,012; 10,213,731; 10,195,615; 10,399,092; 10,328,384; 10,537,843; 10,458,704; 10,549,229; 10,724,793; 10,739,067; 10,807,924; 10,969,169 and/or U.S. Patent Application Publication Nos. US 2018/0031315; US 2020/0018545; US 2020/0018546; US 2020/0298179; US 2020/0316547 and/or US 2020/0318900, all to Sustainable Energy Solutions, Inc., the contents of each of which are hereby incorporated by reference. The $CO_2$ polishing subsystem 128 may also, or in addition, incorporate alcohol dryers.

The $CO_2$ polishing subsystem 128 may or may not have a vapor phase with residual carbon dioxide. If there is a significant residual amount of vapor carbon dioxide, then it can either be vented via line 132 or recycled to the $CO_2$ enrichment subsystem 112, as indicated by line 134. The $CO_2$ polishing subsystem 128 also produces a high purity liquid carbon dioxide stream 136 with a low oxygen content, such as, for example only, greater than approximately 90% to greater than approximately 99% carbon dioxide and less than approximately 10 ppm (mass) oxygen, ready to be pumped to its final destination via optional pump 138.

While the preferred embodiments of the invention have been shown and described, it will be apparent to those skilled in the art that changes and modifications may be made therein without departing from the spirit of the invention.

What is claimed is:

1. A system for separating carbon dioxide from a carrier gas comprising:
    a) a $CO_2$ enrichment subsystem configured to receive a carrier gas stream and produce an enriched carbon dioxide fluid stream;
    b) a $CO_2$ polishing subsystem in fluid communication with the $CO_2$ enrichment subsystem and configured to produce a carbon dioxide rich fluid stream;
    wherein the $CO_2$ polishing subsystem uses cryogenic carbon capture to produce the carbon dioxide rich fluid stream.

2. The system of claim 1 wherein the $CO_2$ enrichment subsystem uses a metal-organic framework, membranes, absorbents, or process modifications to produce the enriched carbon dioxide fluid stream.

3. The system of claim 1 wherein the carrier gas is selected from the group consisting of a flue gas, a process stream, and a waste stream.

4. The system of claim 1 wherein the enriched carbon dioxide fluid stream includes a gas stream containing approximately 35% to 98% carbon dioxide.

5. The system of claim 1 further comprising a compressor and a dehydration unit, where the compressor is configured to receive the enriched carbon dioxide fluid stream from the $CO_2$ enrichment subsystem and to direct a pressurized enriched carbon dioxide fluid stream to the dehydration unit and the dehydration unit is configured to direct a compressed and dehydrated enriched carbon dioxide fluid stream to the $CO_2$ polishing subsystem.

6. The system of claim 1 further comprising a pump configured to receive the carbon dioxide rich fluid stream.

7. A system for separating carbon dioxide from a carrier gas comprising:
   a) a $CO_2$ enrichment subsystem configured to receive a carrier gas stream and produce an enriched carbon dioxide fluid stream;
   b) a $CO_2$ polishing subsystem in fluid communication with the $CO_2$ enrichment subsystem and configured to produce a carbon dioxide rich fluid stream, wherein the carbon dioxide rich fluid stream includes a liquid stream containing greater than approximately 90% to greater than approximately 99% carbon dioxide.

8. A system for separating carbon dioxide from a carrier gas comprising:
   a) a $CO_2$ enrichment subsystem configured to receive a carrier gas stream and produce an enriched carbon dioxide fluid stream;
   b) a $CO_2$ polishing subsystem in fluid communication with the $CO_2$ enrichment subsystem and configured to produce a carbon dioxide rich fluid stream, wherein the carbon dioxide rich fluid stream includes a liquid stream containing less than approximately 10 ppm (mass) oxygen.

9. A system for separating carbon dioxide from a carrier gas comprising:
   a) a $CO_2$ enrichment subsystem configured to receive a carrier gas stream and produce an enriched carbon dioxide fluid stream;
   b) a $CO_2$ polishing subsystem in fluid communication with the $CO_2$ enrichment subsystem and configured to produce a carbon dioxide rich fluid stream, wherein the $CO_2$ polishing subsystem includes a distillation column in fluid communication with the carbon enrichment subsystem, said distillation column configured to concentrate $CO_2$ as a liquid in the bottom stream and concentrate light gases as a distillate stream.

10. The system of claim 9 further comprising a condenser configured so that the vapor from the distillation column is directed as a recycle stream to the $CO_2$ enrichment subsystem or vented.

11. The system of claim 10 wherein the condenser refrigerant is selected from the group consisting of propane, R134a and HFO-1234yf.

12. The system of claim 10 further comprising a dehydration unit that receives the recycle stream for regeneration, where the dehydration unit is configured to direct at least a portion of the recycle stream to the $CO_2$ enrichment subsystem after regeneration.

13. The system of claim 9 wherein the $CO_2$ polishing subsystem includes a plurality of distillation columns.

14. The system of claim 9 further comprising a decant vessel or trays that phase-separates liquid water from $CO_2$.

15. The system of claim 9 further comprising a dehydration unit configured to receive the enriched carbon dioxide fluid stream from the $CO_2$ enrichment subsystem and to direct a dehydrated, enriched carbon dioxide fluid stream to the $CO_2$ polishing subsystem.

16. The system of claim 9 further comprising a compressor configured to receive the enriched carbon dioxide fluid stream from the $CO_2$ enrichment subsystem and to produce a pressurized enriched carbon dioxide fluid stream, said compressor including a compressor outlet in fluid communication with the $CO_2$ polishing subsystem.

17. The system of claim 16 further comprising a dehydration unit in fluid communication with the compressor.

18. A method for separating carbon dioxide from a carrier gas comprising the steps of:
   a) receiving a carrier gas in a $CO_2$ enrichment subsystem;
   b) producing an enriched carbon dioxide fluid stream in the $CO_2$ enrichment subsystem;
   c) directing the enriched carbon dioxide fluid stream to a $CO_2$ polishing subsystem;
   d) producing a stream further enriched in carbon dioxide in the $CO_2$ polishing subsystem using cryogenic carbon capture.

19. The method of claim 18 wherein step b. includes using a metal-organic framework, membranes, absorbents, or process modifications to produce the enriched carbon dioxide fluid stream.

20. The method of claim 18 wherein the carrier gas is a flue gas, a process stream, or a waste stream.

21. The method of claim 18 wherein the enriched carbon dioxide fluid stream includes a gas stream containing approximately 35% to 98% carbon dioxide.

22. A method for separating carbon dioxide from a carrier gas comprising the steps of:
   a) receiving a carrier gas in a $CO_2$ enrichment subsystem;
   b) producing an enriched carbon dioxide fluid stream in the $CO_2$ enrichment subsystem;
   c) directing the enriched carbon dioxide fluid stream to a $CO_2$ polishing subsystem;
   d) producing a stream further enriched in carbon dioxide in the $CO_2$ polishing subsystem using a distillation column.

23. The method of claim 22 further comprising the step of compressing the enriched carbon dioxide fluid stream.

24. The method of claim 22 further comprising the step of dehydrating the enriched carbon dioxide fluid stream.

25. A method for separating carbon dioxide from a carrier gas comprising the steps of:
   a) receiving a carrier gas in a $CO_2$ enrichment subsystem;
   b) producing an enriched carbon dioxide fluid stream in the $CO_2$ enrichment subsystem;
   c) directing the enriched carbon dioxide fluid stream to a $CO_2$ polishing subsystem;
   d) producing a stream further enriched in carbon dioxide in the $CO_2$ polishing subsystem including includes a liquid stream containing greater than approximately 90% to greater than approximately 99% carbon dioxide.

26. A method for separating carbon dioxide from a carrier gas comprising the steps of:
   a) receiving a carrier gas in a $CO_2$ enrichment subsystem;
   b) producing an enriched carbon dioxide fluid stream in the $CO_2$ enrichment subsystem;

c) directing the enriched carbon dioxide fluid stream to a CO$_2$ polishing subsystem;
d) producing a stream further enriched in carbon dioxide in the CO$_2$ polishing subsystem including a liquid stream containing less than approximately 10 ppm (mass) oxygen.

\* \* \* \* \*